April 14, 1925.
E. B. SMOAK
1,533,475
VEHICLE BODY FOR GRAIN OR STOCK
Filed Aug. 10, 1923
3 Sheets-Sheet 1
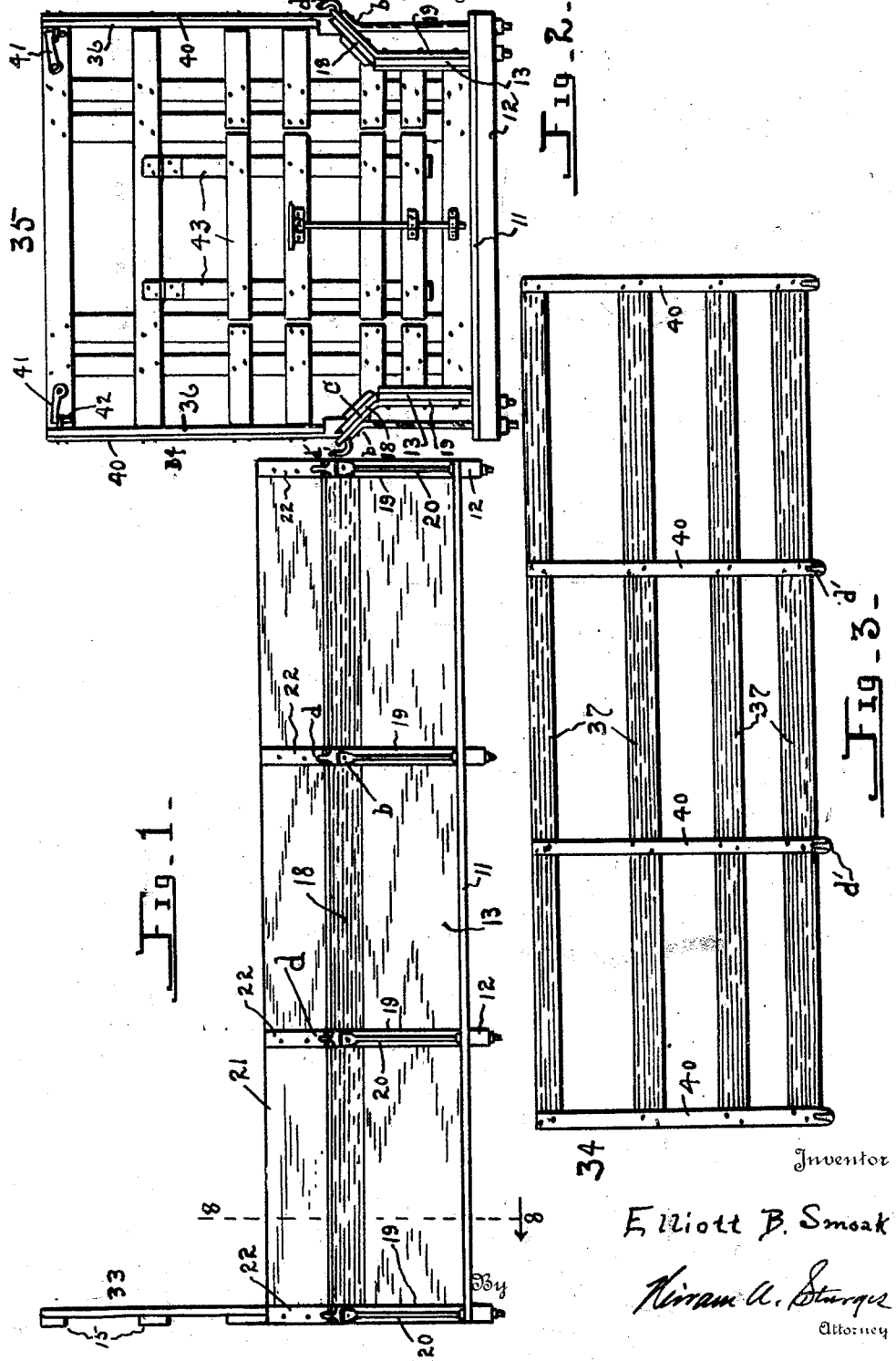

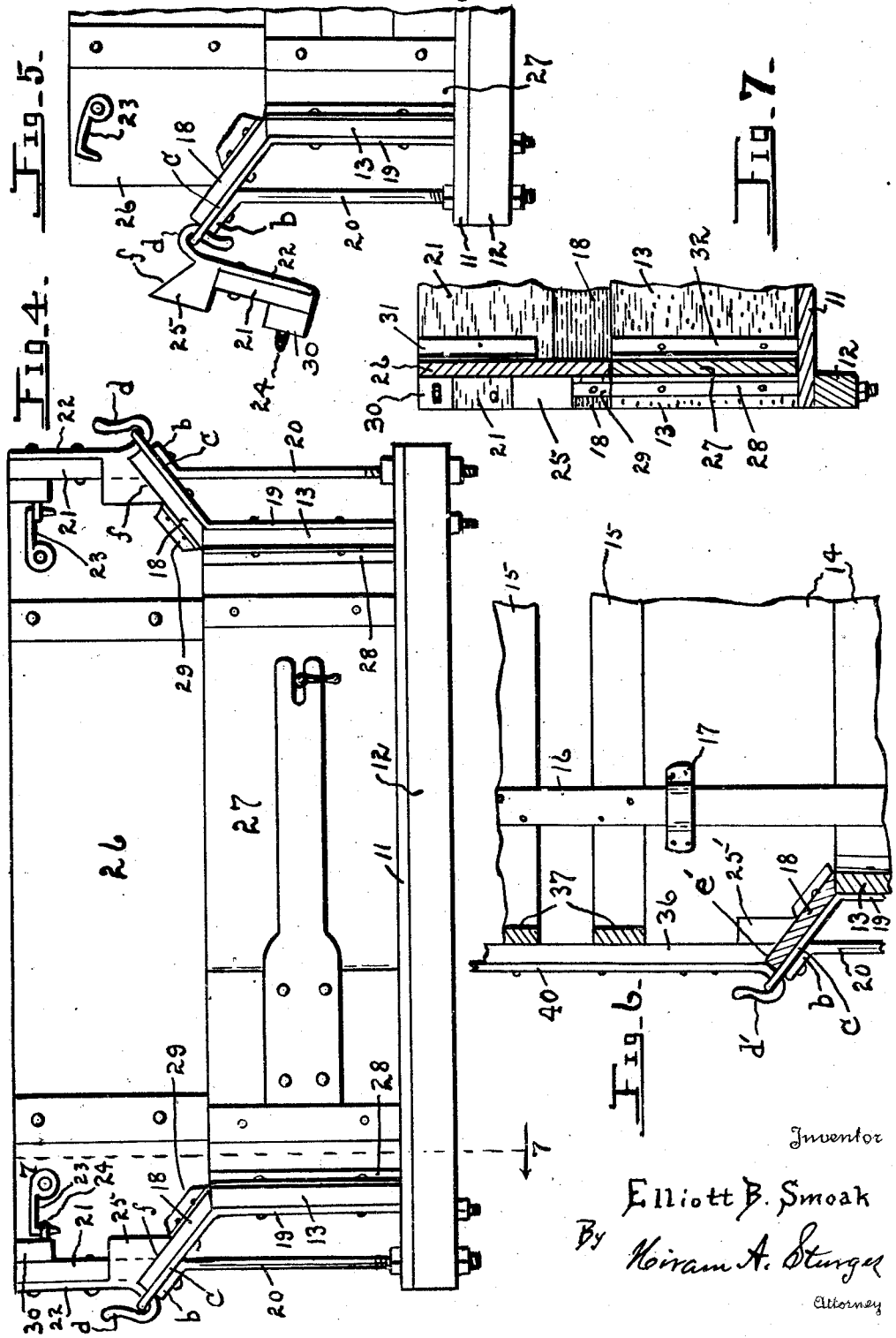

April 14, 1925.
E. B. SMOAK
1,533,475
VEHICLE BODY FOR GRAIN OR STOCK
Filed Aug. 10, 1923
3 Sheets-Sheet 3
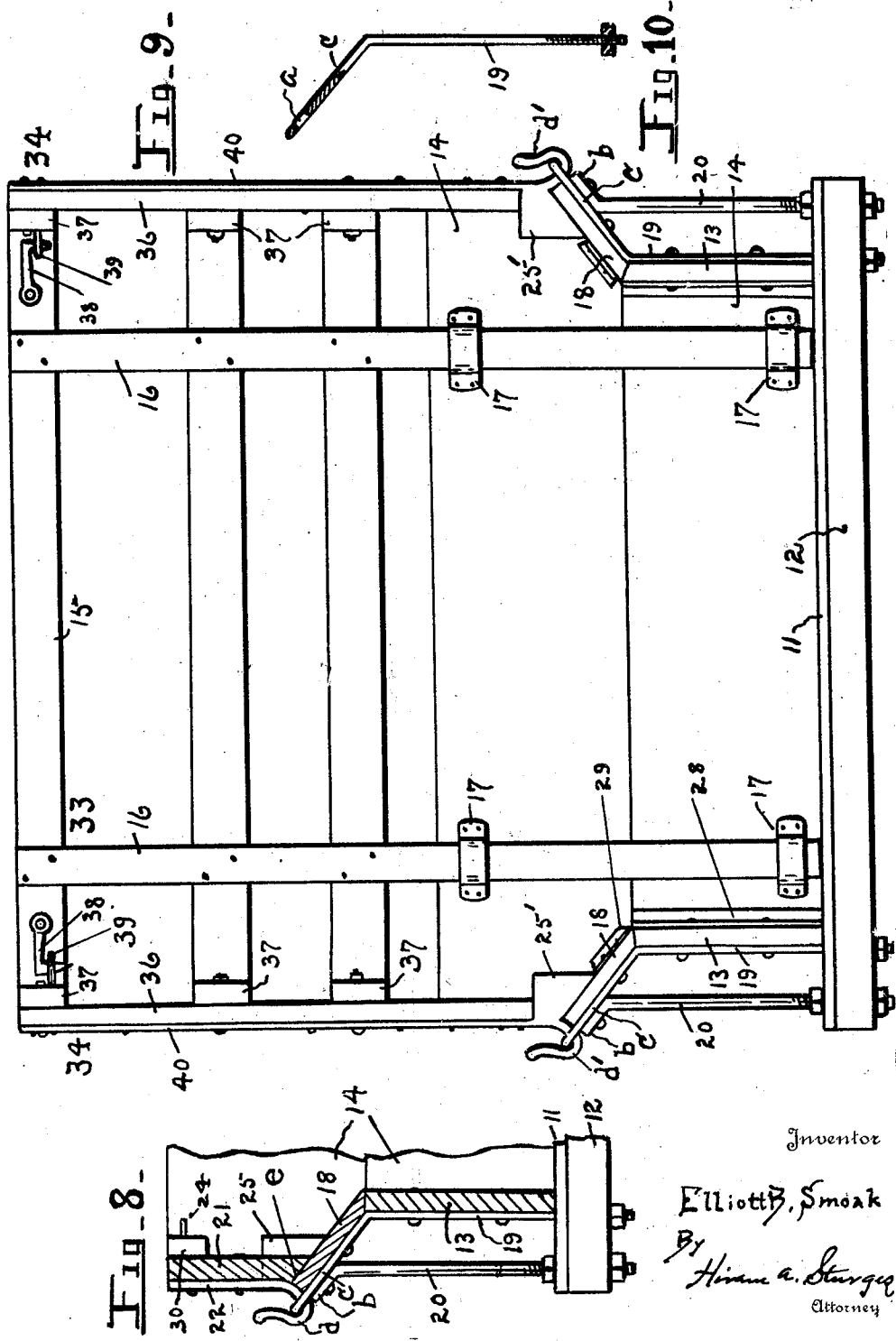

Patented Apr. 14, 1925.

1,533,475

UNITED STATES PATENT OFFICE.

ELLIOTT B. SMOAK, OF DATONA, FLORIDA.

VEHICLE BODY FOR GRAIN OR STOCK.

Application filed August 10, 1923. Serial No. 656,723.

*To all whom it may concern:*

Be it known that I, ELLIOTT B. SMOAK, a citizen of the United States, residing at Datona, in the county of Volusia and State of Florida, have invented certain new and useful Improvements in a Vehicle Body for Grain or Stock, of which the following is a specification.

This invention relates to a vehicle body having adjustable features for carrying grain or live stock, and has for its object to provide additional features and improvements relating to the construction shown in the patent application, Serial No. 336,607, filed in the U. S. Patent Office Nov. 8, 1919, by John F. Kirkman and assigned to applicant, for combined grain carrier and stock rack for vehicles.

One of the specific objects is to provide certain improved coupling-bars for the box which will adequately support the sides of the box and the divergent side plates of said box and will provide eyes for the hook-bars of the wings, and will also provide eyes for the hook-bars of the stock rack.

Another object is to provide such a construction for the hook-bars of the wings and the coupling-bars, that they will co-operate in a manner to prevent disengagement when said wings are swung downwardly to their lowermost position.

Another improvement found to be of great advantage, when the parts are arranged for carrying grain, is to provide means whereby the wings and side-plates will adequately support stresses directed thereto by the load, and will prevent any loss or escape of the grain.

Another object is to provide such a mounting for the stock-rack that its end-section may be conveniently and readily removed from the box or placed in position. Another improvement is to provide such a mounting for the stock-rack that it will adequately sustain stresses directed thereto, incident to its use when hauling live stock.

With the foregoing objects in view and others mentioned hereinafter, the invention presents a novel and useful construction, combination and arrangement of parts as described herein and claimed, and as illustrated by the accompanying drawings, wherein—

Fig. 1 is a side view of the vehicle body arranged as a carrier for grain. Fig. 2 is a rear view of the vehicle body arranged as a carrier of live stock. Fig. 3 is a side view of the stock rack. Figs. 4 to 9, inclusive, are enlarged details showing the improvements. Fig. 4 is an end view of the vehicle body arranged as a grain carrier. Fig. 5 is an end view showing a wing when swung downwardly to its lowermost position. Fig. 6 is a broken away detail relating to Fig. 9, being a transverse section through the stock-rack looking to the front of the vehicle body. Fig. 7 is a broken away detail showing a part of the grain carrier in longitudinal section, the section being on line 7—7 of Fig. 4. Fig. 8 is a broken away detail, being a transverse section on line 8—8 of Fig. 1, that part of the stock-rack at the front of the vehicle body and shown in Fig. 1, being omitted. Fig. 9 is a view looking to the front end of the vehicle body when arranged as a carrier of live-stock, the rear end of the stock-rack being removed. Fig. 10 is a side view, partly in section, of a coupling-bar.

Referring now to the drawing for a more particular description, the invention is shown and described in connection with a vehicle box having a bottom 11 mounted on cross-bars 12, for use in securing the vehicle body to the chassis of a truck or other vehicle. At 13 are indicated the vertical sides for the box, and a frame-section 33 (Figs. 1. 9.) is provided for closing the front end of the box, consisting, in part, of a pair of horizontal end-plates 14 (Figs. 6. 8. 9.), these preferably being connected permanently with the sides 13; horizontal cross-strips 15 being employed, to which are secured a pair of vertical slide-strips 16 adapted to engage in holder-brackets 17 provided for the end-plates 14, whereby this part of the closure for the front end of the vehicle is removable, but is adapted to be used when the parts are arranged as a carrier for live stock.

Numerals 18 indicate a pair of side plates which diverge upwardly and outwardly from the vertical sides of the box, these being supported in their inclined position by means of a plurality of angular coupling-bars 19, each being mounted at its lower end in a cross-bar 12, and provided at its upper end with an eye $a$ (Fig. 10.).

Standards 20 are employed, each being mounted at its lower end in a cross-bar 12 and having an inclined upper part $b$ bearing upon the inclined part $c$ of a coupling-bar 19, and terminating closely adjacent to the eye $a$ of said bar.

As thus described a very strong construction is provided for the box and particularly for the inclined side-plates 18, so that stresses directed thereto will be adequately sustained.

In order that loads of grain, larger than ordinary, may be carried a pair of wings 21 are provided, and in order that they may be conveniently attached to or may be readily removed from the side-plates 18, they are provided with hook-bars 22, their hooks d being adapted to engage in the eyes a of the coupling-bars, and said wings may be swung upwardly and may be maintained in a vertical position when attached to the frame-section 33, and this attachment may be accomplished by any suitable means, the means herein shown being hooks 23 adapted to engage in staples 24.

Means are provided tending to prevent any movement of the wings independently of the inclined side-plates 18 after said wings have been swung upwardly to a vertical position, and also to prevent any loss of grain from the carrier, which, otherwise, might occur between the inner edges of the wings and upper, inclined surfaces of the side-plates, said means consisting, in part, of the mitered edges e of the wings, best shown in Fig. 8, and the heels or blocks 25 provided for the hook-bars, the inclination of the edges e of said wings and the contact-faces f for said blocks 25 being of such degree that they will engage the inclined surfaces of the side-plates when said wings have been swung to a vertical position.

The wings may have any suitable width so that the holding capacity for the vehicle body may be very great, and on account of the construction as described, all stresses directed to the side plates 18 will be adequately resisted and no loss of grain will occur at the junction of said wings and side-plates.

It is often desirable to use the vehicle when the wings have been swung downwardly to the position shown in Fig. 5, and the construction is of such arrangement that when thus disposed, the hooks d will not become detached from the eyes a after the wings have been swung downwardly to their lowermost position, for the reason that the hooks will engage the inclined, terminal parts b of the standards 20, and this engagement prevents the wings from swinging downwardly to a vertical position, the weight of the wings being supported upon members b and the curved terminal of each hook, at that time, being disposed below and projecting toward the inclined terminal part b of a standard. This feature has been found to be convenient in operation since the vehicle body is often used with the wings swung downwardly to facilitate loading, and when driven from one place to another or when loading the carrier, jolts or vibration will not cause detachment of the wings. However, if swung outwardly approximately 45 degrees, the wings may be readily removed from the side-plates 18 or when disposed at that angle, may be mounted on the side-plates.

When arranged for use as a carrier of grain, a closure is made, of course, for the rear end, said rear end-gate consisting of the horizontal plates 26 and 27, adapted to be removably mounted between stop-members 28, 29, 30, at one of their sides, and stop-members 31 and 32 at their opposite sides.

For use as a carrier of live stock, a rack is provided which, when assembled, is approximately rectangular in plan, and consists of a pair of side-frames 34, a frame-section 35 (Fig. 2,) for a rear end closure, together with the frame-section 33 above described.

Each frame-section 33 for the sides, preferably consists of a plurality of vertical strips 36, to which are suitably secured horizontal strips 37, and the latter may be removably secured to the frame-section 33 by any suitable means, as by use of hooks 38 adapted to engage in staples 39, best shown in Fig. 9.

Since the vertical strips 36 are provided with hook-bars 40, their hooks d' may engage in the eyes a of the coupling-bars 19 the same as already described, said hook-bars being disposed at longitudinal intervals of the side frames 34 so that the hooks will register with said eyes, and the side frames may be readily mounted to be disposed vertically upon the inclined side-plates 18 for use as a stock-rack.

It will be appreciated that the stresses directed to the vehicle box and inclined side-plates 18 may be very great, since the side frames 34 may be pressed outwardly by movements of the live stock when the vehicle is loaded, and therefore the parts are arranged to resist stresses, the contact-blocks or heels 25' (Figs. 6, 9,) for the hook-bars 40 and the inclined facets e' (Fig. 6.) of the vertical strips 36 being in engagement with the upper, inclined surfaces of the side-plates 18, and operating to resist transverse stresses to advantage.

The frame section 35 may be removably mounted to operate as a closure for the rear end of the stock-rack, the lower part thereof being disposed between the stop-members 28, 29, 25' for one of its sides, and the stop-members 31 and 32 at its opposite side, the hooks 41 co-operating with staples 42 for connecting said frame-section with the side-frames 34.

Numeral 43 indicates a hingeably mounted gate which is provided for the frame-section 35, for use when loading or unloading live stock, and it will be appreciated that the rear frame section 35 may be conveniently removed since it is not connected with the side frames 34 except by the hooks 41. To remove the rear section 35, after the hooks 41 have been detached from the staples 42, all that is necessary for such removal will be to elevate it until its lower part is disengaged from the stop-members shown in Fig. 7.

While I have shown and described parts in detail, I do not wish to be understood as limiting myself in this respect, and changes in size, form and proportion and minor details may be made, as found to be of advantage, said changes being determined by the scope of the invention as claimed.

I claim as my invention—

A vehicle body comprising a box having side plates projecting inclinedly from its top, coupling-bars each provided with an eye an secured to a side plate and a side of the box, a stock-rack including side-frames having vertical strips formed with inclined facets at their lower ends, a plurality of bars secured to the vertical strips of the side frames each being provided with a bearing-block and having a hook for engaging in an eye of a coupling bar to permit swinging movements of the side-frames to a vertical position, the inclined facets of said vertical strips and said bearing-blocks moving into engagement with the inclined side plates of said box.

In testimony whereof, I have affixed my signature in presence of two witnesses.

ELLIOTT B. SMOAK.

Witnesses:
HIRAM A. STURGES,
ARTHUR H. STURGES.